United States Patent Office 3,134,271
Patented May 26, 1964

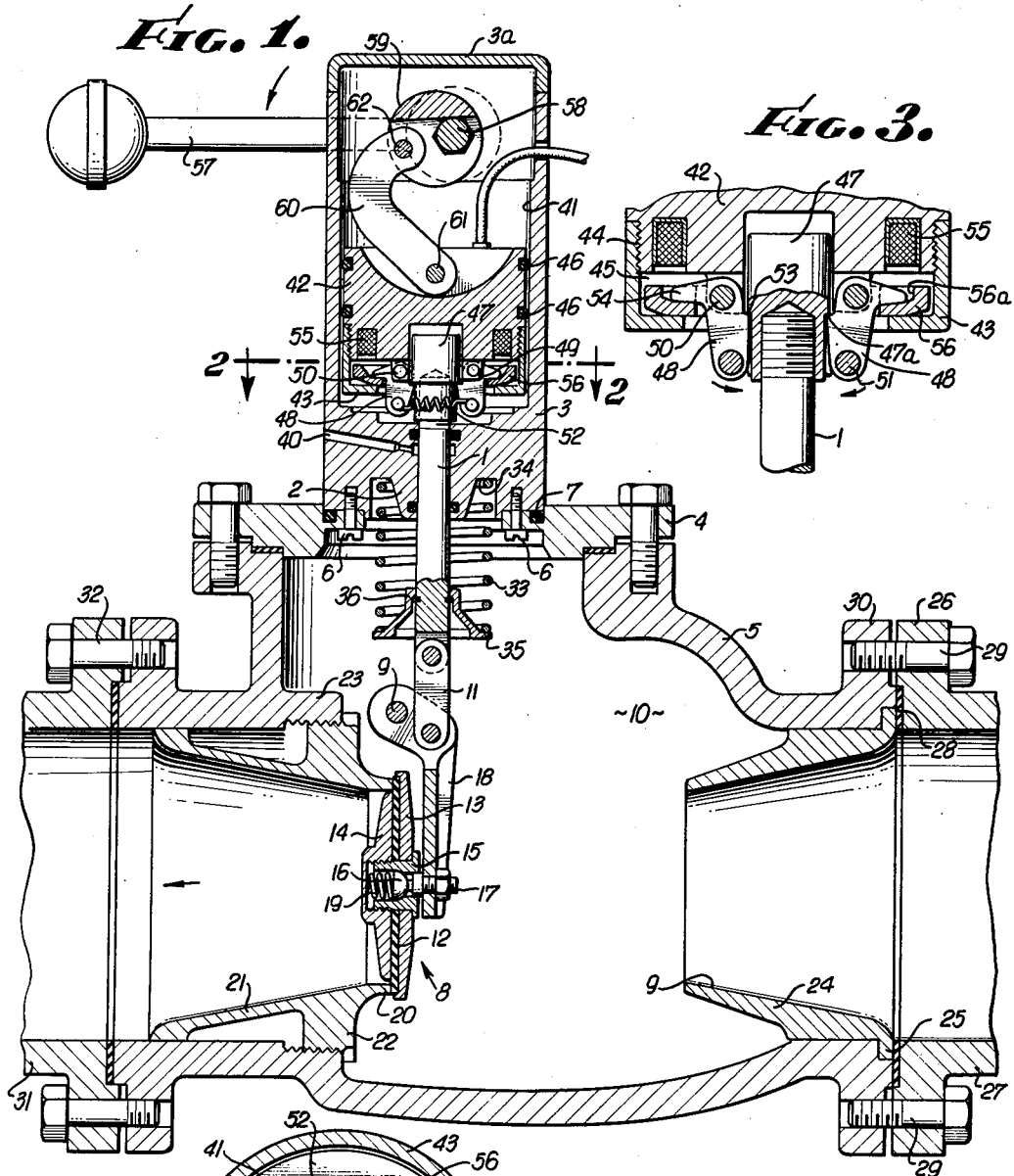

3,134,271
STRUCTURE UTILIZING ELECTRIC RELEASE
William A. Ray, North Hollywood, Calif., assignor to General Controls Co., a corporation of California
Filed Jan. 29, 1962, Ser. No. 169,452
2 Claims. (Cl. 74—593)

This invention relates to electrically energized releasing means. Such devices for example, are useful in connection with valves. The closures of such valves may be moved by mechanical means between open and closed position; by the use of electrical energy, as taught herein, the closure can be released from its mechanical operator, and be moved as by spring pressure, to closed position.

It is one of the objects of this invention to provide a simple and effective electrically operated means for releasing the closure from the mechanical means.

It is another object of this invention to assure that the mechanical operator will remain incapable of moving the closure until the electrically operated means is deenergized.

In order to accomplish these results, the mechanical operator (which may be manually moved) is provided with two parts normally latched together, but the latch is released when an electromagnet is energized. That portion of the operator which carries the releasable element of the latch also carries the electromagnet. Thereby the continuation of energization of the electromagnet maintains the latch ineffective.

It is accordingly another object of this invention to provide a latching device and releasing means that are reliable in operation and that can be compactly arranged in relation to the mechanical operator.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a vertical sectional view of a structure incorporating the invention, in this instance shown as a valve with its closure member in closed position;

FIG. 2 is an enlarged sectional view, taken along a plane corresponding to line 2—2 of FIG. 1;

FIG. 3 is an enlarged vertical sectional view of a portion of the structure shown in FIG. 1, and illustrating a latch mechanism.

Figure 4:
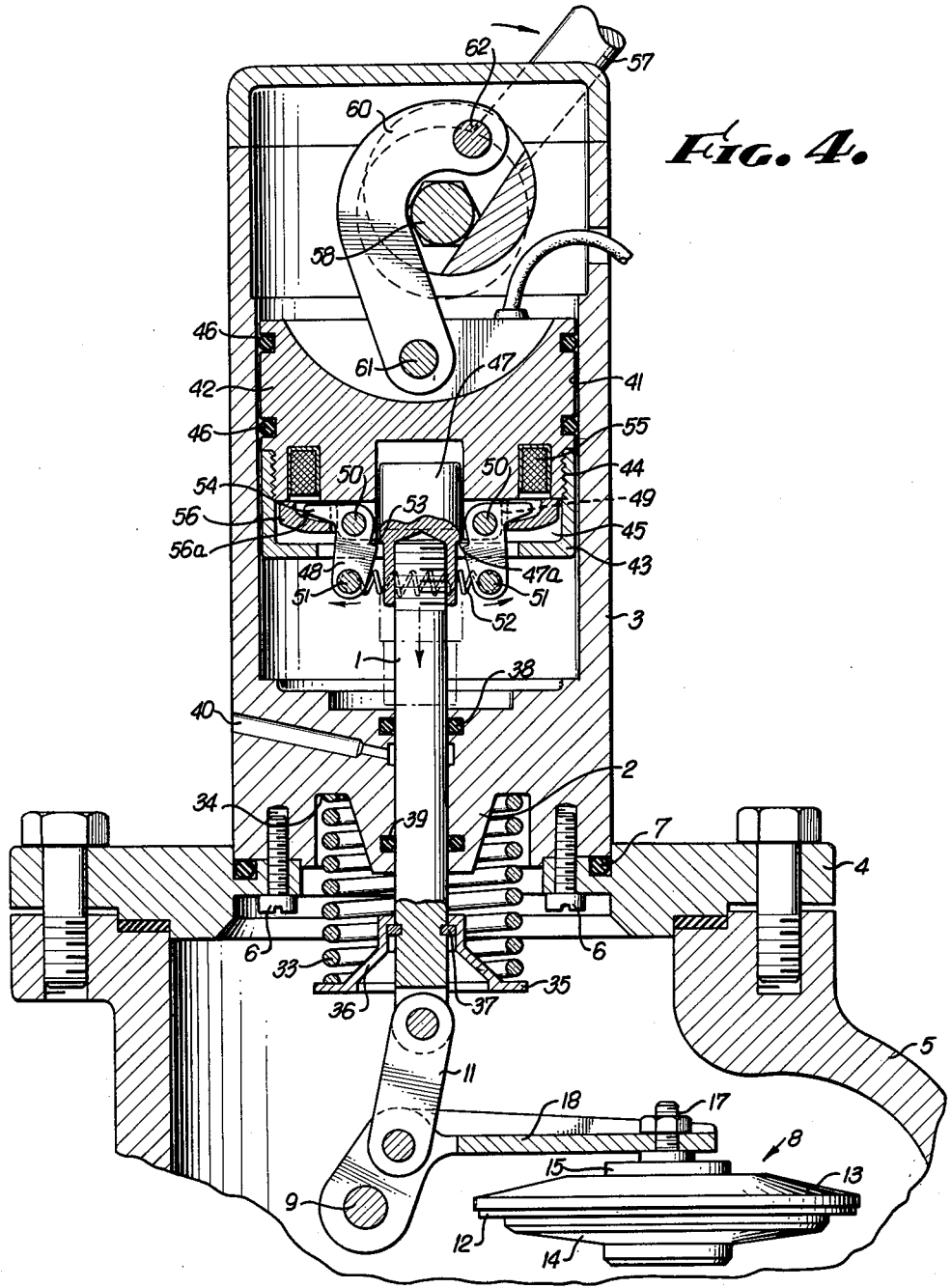
FIG. 4 is an enlarged fragmentary vertical section, similar to FIG. 1, but with the latch mechanism shown as releasing the valve closure.

A stem 1 is indicated, adapted to be moved axially, as for operating a valve structure. The specific details of the valve structure will be described hereinafter. The valve closure stem 1 may be considered as a movable load.

The stem 1 is guided in a boss 2 (FIGS. 1 and 4) formed in the base or bottom wall of a frame member or casing 3. The lower portion of the frame member 3 is substantially cylindrical. Its upper open end is closed by a cover 3a. It is sealingly joined to a cover or bonnet 4 that cooperates to cover the upper opening of a valve body 5. For example, screws 6 may be provided for holding frame member or casing 3 to the cover 4. An O-ring 7 may be interposed in a groove formed in the upper surface of the cover member 4 to provide an adequate fluid seal. In this way, escape of fluid to the operator mechanism is prevented.

In this instance the stem 1 is adapted to operate a valve closure structure 8. The valve closure structure 8 is shown in closed position in FIG. 1 and in open position in FIG. 4.

The valve closure structure 8 is mounted on lever 18, which is connected as by a link 11 to the lower end of the plunger 1. The closure structure 8 includes a yielding closure 12 held in place on back support 13 as by a threaded member 14. This threaded member 14 engages the threads of a hollow fastener 15 which passes through the elements 12, 13 and 14.

The closure structure 8 is mounted by aid of the hollow fastening means 15 upon a spherical member 16 which is formed as the inner end of a threaded member 17. This threaded member 17 is attached to the lower end of lever 18. The lever 18 being pivoted on the pin 9 serves to support the closure structure 8; and the spherical member 16 provides for universal movement of the closure structure 8 about the center of the surface of the member 16.

A compression spring 19 enclosed between the members 14 and 15 serves to urge the spherical member 16 against the spherical seat formed in the member 15.

The closure structure 8 is adapted to cooperate with a valve seat 20 formed on an outlet insert 21. This insert 21 has an inner externally threaded flange 22 by which it is attached to the internally threaded boss 23 formed integrally with the body 5.

The inlet insert 24 is telescoped within the right-hand end of the body 5. It is provided with a flange 25 by which it is held in place within the body 5 as by the flange 26 of an inlet conduit 27. A gasket or packing 28 is provided between the flange 26 and the right-hand surface of the body 5.

Bolts 29 serve to attach the inlet conduit 27 to the flange 30 of the body 5.

Similarly, a flanged outlet conduit 31 is attached as by bolts 32 to the left-hand side of the body 5.

The stem 1 is resiliently urged to the closing position by aid of a compression spring 33 extending around the lower end on the stem. Thus, the upper end of the spring engages an annular surface 34 formed around the boss 2. Its lower end engages a flange 35 of a spring retainer 36. This spring retainer is limited in its downward movement by a spring ring 37 mounted near the lower end of the stem 1.

The stem 1 is guided by the boss 2. A pair of spaced O-rings 38 and 39 disposed in annular grooves in the boss 2 and member 3 serve to maintain a seal around the stem 1. A drain 40 located intermediate these rings serves to expel any fluid that may pass the ring 39.

There are provisions for mechanically moving the stem 1 in an axial direction for correspondingly moving the closure structure 8 between its closed position and open position, shown respectively in FIGS. 1 and 4.

For this purpose casing 3 is provided with an interior cylindrical surface 41 guiding a piston-like member 42. This piston-like member and the cylindrical surface 41 are coaxial with the stem 1. This piston-like member is provided with a cap 43 as by the aid of threads 44 and forming a space 45 between the surface of the piston-like member 42 and the lower wall of cap 43. O-rings 46 are disposed in grooves in the periphery of piston member 42 to provide a sealing effect between the piston 42 and the surface 41.

Arrangements are made for latching the piston member 42 to the top of the stem 1. For this purpose a head 47 is in threaded engagement with the upper end of stem 1.

Shoulder 47a is formed around the head 47 to provide an element of a latching arrangement. The latch between the piston member 42 and the head 47 is accomplished by a pair of catches 48. Each catch is pivotally mounted by the aid of a spaced pair of ears 49 (FIG. 2) integrally formed with the bottom of the piston-like member 42. The pairs of ears are disposed on opposite sides of the axis of the stem 1.

Pivot pins 50 for these catches 48 are appropriately fastened to the catches to prevent axial movement between them and the ears 49. These catches at their lower ends are provided with transverse pins 51 urged toward each other as by the tension springs 52. When the springs are active they serve to bring the latching surfaces 53 of these catches directly underneath the shoulder 48 as shown in FIG. 3. Thereby a latching effect is obtained. Under such circumstances, movement of the piston member 42 within the cylindrical surface 41 results in opening and closing movement of the valve closure structure 8. However, the catches 48 may be released, as indicated in FIG. 4. When this happens, the spring 33 at the bottom of the stem 1 is sufficient to bring the closure structure 48 to the position of FIG. 1, and the piston member 42 is ineffective to move the stem 1.

The catches 48 are provided with arms 54. The piston structure 42 is made of magnetic material. A magnetizing coil 55 is disposed in a groove in the lower face of the piston structure 42, to form a central pole piece. An annular armature 56 is located in a space 45, and is adapted to be attracted to the position of FIG. 4 when the coil 55 is energized. The unenergized position is illustrated in FIG. 3; and the energized position is indicated in FIG. 4. Arms 54 are located in grooves 56a formed in the upper surface of armature 56. The inner edge of the annular armature 56 engages the arms 54 and releases the catches 48 when the coil 55 is energized.

With the coil 55 unenergized, the piston structure 42 can be moved within the cylindrical surface 41 by the aid of a handle 57. This handle is mounted on a hexagonal shaft 58 which extends exteriorly of the member 3. It causes rotation of an eccentrically mounted collar 59 which is located within the upper part of the member 3. This collar is slotted to receive the upper end of a curved link 60, connected as by pivot pin 61 to the piston 42. The link 60 is curved so that in the open position of FIG. 4, the upper pivot 62 of link 60 goes over center with respect to the hexagonal shaft 58. This shaft serves as a stop for any further clockwise movement beyond the position of FIG. 4; thereby maintaining the valve open even after handle 57 is released.

While the electromagnet coil 55 is energized, movement of the handle 57 between the positions of FIGS. 1 and 4 is ineffective to move the valve closure 8 to open position. When the coil 55 is deenergized, movement of the handle 57 to the position of FIG. 1 causes the catch members 48 to engage the shoulder 53 and mechanical connection is therefore established between the piston member 42 and the stem 1, as indicated in FIG. 1. During such deenergization, the mechanical operation to move the closure structure 8 to open or closed position, is effective through the latching mechanism.

The inventor claims:
1. In apparatus for positioning a load: a frame having a base and walls forming a cylindrical space on one side of the base; said base having an axial bore; a stem guided in the bore and having one end located in said space provided with a latching head; spring means acting upon the other end of the stem urging the stem so the head moves toward the base; an operating member guided by said walls for axial movement therein, said operating member having a surface opposed to the base; said operating member having a recess extending circularly about said axis; an electromagnet coil mounted in said recess; said end surface of said operating member providing polar areas for said electromagnet coil; a cap carried by said one end of said operating member and defining with said one end, a circular space; an armature ring in said space and movable toward and away from said surface between small limits determined by said cap; a pair of catches pivotally mounted by said member on opposite sides of said axis for releasable engagement with said head, said catches having arms projecting radially outwardly and located between said ring and said end surface for releasing said catches upon movement of said ring toward said surface; springs having ends carried by the respective catches for moving the catches toward latching position; and a handle connected to the operating member.

2. In apparatus for positioning a load: a frame having a base and walls forming a cylindrical space on one side of the base; a stem guided by the base for movement parallel to the axis of the cylindrical space and having one end located in said space provided with a latching head; an operating member for said stem and guided by said walls for axial movement therein; said operating member having an end opposed to said stem; a number of latching levers pivotally mounted at said one end of said operating member for releasable engagement with said latching head; spring means acting upon said latching levers for urging them into latching position; spring means urging the stem so that the head moves toward said base, said latching levers having arms projecting radially of said stem, movement of said arms toward said one end moving said latching levers to releasing position; an armature ring mounted at one end of said operating member surrounding said stem; said latching lever arms projecting between said armature ring and said operating member end so that said latching levers are moved to releasing position by movement of the ring toward said one end; and an electromagnet coil mounted by said operating member and extending circularly about said axis for moving said armature ring toward said one end of said operating member; and a handle connected to said operating member.

References Cited in the file of this patent
UNITED STATES PATENTS

| | | |
|---|---|---|
| 1,471,094 | Bloss | Oct. 16, 1923 |
| 1,980,493 | Morisseau | Nov. 13, 1934 |
| 2,258,811 | Ray | Oct. 14, 1941 |
| 2,992,594 | Anderson et al. | July 18, 1961 |

FOREIGN PATENTS

| | | |
|---|---|---|
| 532,775 | Italy | Apr. 22, 1955 |